United States Patent [19]

Thorby et al.

[11] 4,173,323

[45] Nov. 6, 1979

[54] AIRCRAFT LAUNCHING TECHNIQUES

[75] Inventors: Douglas C. Thorby, Shepperton; John Johnson, Chertsey, both of England

[73] Assignee: Hawker Siddeley Aviation Limited, England

[21] Appl. No.: 866,920

[22] Filed: Jan. 4, 1978

[30] Foreign Application Priority Data

Jan. 13, 1977 [GB] United Kingdom ............... 1391/77

[51] Int. Cl.² .................................................. B64F 1/00
[52] U.S. Cl. .................................. 244/114 R; 244/63; 114/261
[58] Field of Search ............. 244/63, 114 R; 114/258, 114/261

[56] References Cited

U.S. PATENT DOCUMENTS

| | | | |
|---|---|---|---|
| 1,706,065 | 3/1929 | Jenkins | 244/63 |
| 2,330,733 | 9/1943 | Olaszy | 244/63 |
| 2,924,148 | 2/1960 | Fiedler | 244/63 |

OTHER PUBLICATIONS

Fozard, "Ski Jump Harrier", *Flight International*, Dec. 4, 1976, pp. 1630-1635.

*Primary Examiner*—Galen L. Barefoot
*Attorney, Agent, or Firm*—Rose & Edell

[57] ABSTRACT

An aircraft take-off runway, especially a ship's flight desk, is provided with a terminal ramp that curves upward to launch the aircraft in a semi-ballistic trajectory. The ramp is so configured as to have a varying contour or profile, in longitudinal section, at different regions across it, such that the path up the ramp of wheels on the center line of the aircraft is different from the path of wheels off the center line, e.g. outrigger wheels, whereby a desired pitching moment is imparted to the aircraft at launch.

5 Claims, 1 Drawing Figure

U.S. Patent   Nov. 6, 1979   4,173,323
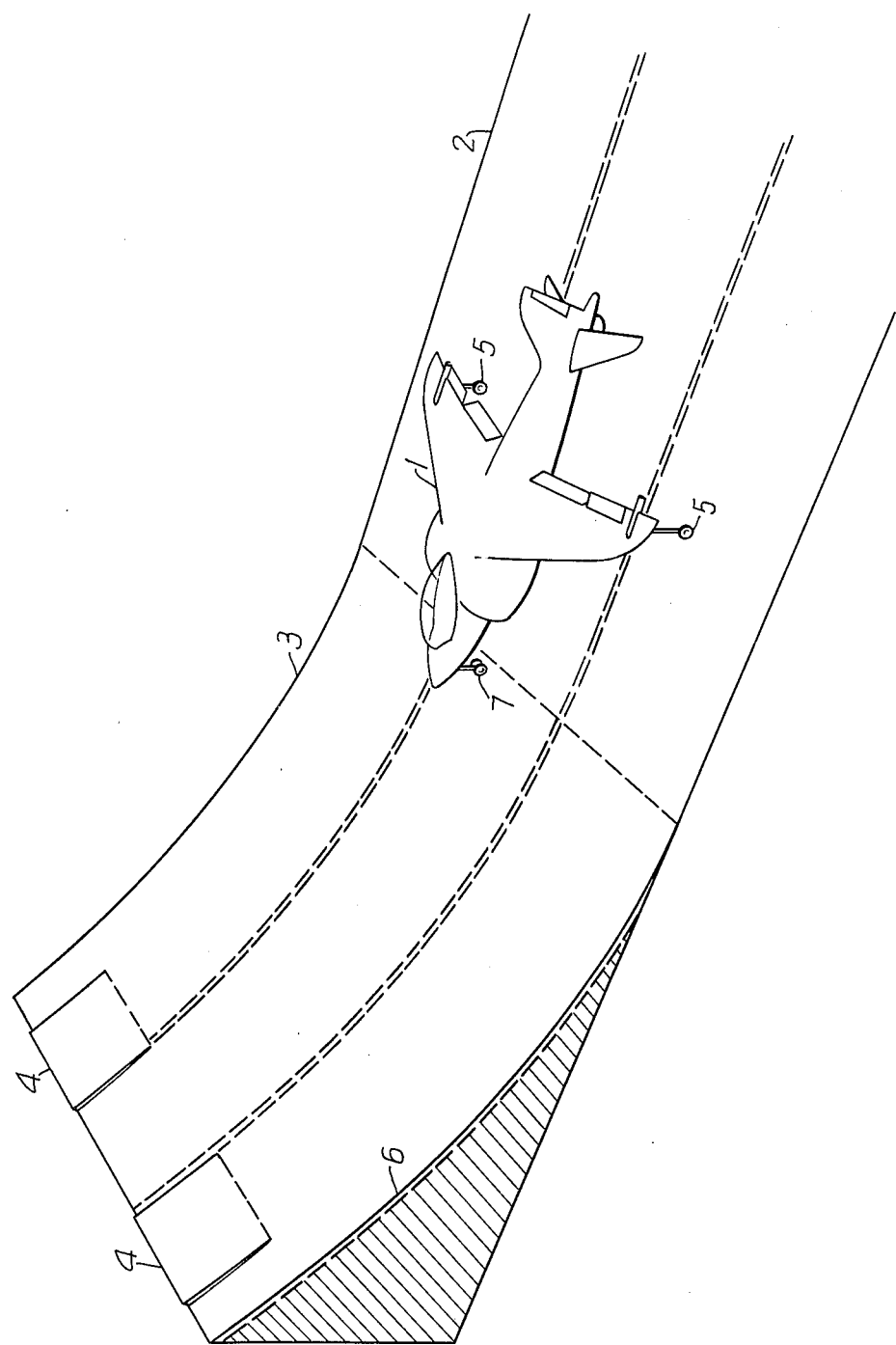

AIRCRAFT LAUNCHING TECHNIQUES

This invention relates to aircraft launching techniques. More particularly it provides an improved form of semi-ballistic launch with special, though not exclusive, application to those aircraft having the ability to vector all or part of their propulsive thrust from a horizontal to a substantially vertical direction.

Aircraft of the vectored thrust, vertical or short take-off and landing (VSTOL) type (e.g. the Hawker Siddeley Harrier) have been, or are being, developed or adapted for operation from naval vessels such as the Royal Navy's command cruiser. Though this type of aircraft utilises a take-off distance very much shorter than conventional aircraft it still requires unobstructed flight deck space in order of 500 ft. To exploit its inherent tactical flexibility it would be desirable to significantly improve its take-off capability such that it could readily operate not only from conventional aircraft carriers but also from other types of vessel providing minimal deck space.

One known technique is the semi-ballistic launch, in which an aircraft accelerates under its own power, with thrust substantially in the direction of motion, first horizontally along a deck and then up a curved ramp such that its velocity at the exit from the ramp is at a specified angle to the horizontal. In the vicinity of the end of the ramp the pilot vectors thrust to a pre-selected angle and controls the aircraft in pitch such that the aircraft departs from the ramp at a desired angle of incidence which is substantially maintained whilst the aircraft accelerates through a semi-ballistic trajectory until the airspeed is high enough to maintain level or climbing flight. The launch velocity or endspeed at exit from such a ramp is a fraction of that required for a flat-deck short take-off and thus the deck length needed to achieve this reduced endspeed is very small.

In determining optimum ramp form, many factors must be taken into account if unacceptable operational limitations are not to be imposed on the aircraft. For example, the chosen combination of ramp angle, height and lenght, together with the choice of circular arc or parabolic longitudinal cross-section, may determine the aircraft maximum take-off weight if an undesirable degree of oleo compression due to centrifugal and other effects of the aircraft traversing the ramp are to be avoided.

Of equal, if not greater, significance, however, is the rate of change of aircraft pitch angle during the initial trajectory on leaving the ramp. For the first few seconds following ramp exit the aircraft has a near-parabolic trajectory and it can be made to adopt the correct variation of attitude (i.e. flight path angle and desired angle of incidence) virtually without any corrective aerodynamic pitch action provided the correct initial pitch rate is imparted at launch. On the other hand the aircraft, on leaving the ramp, may possess a rate of pitch which requires excessive pilot skill for its correction, or which may even be beyond the range of aircraft control power.

It is an object of the present invention to tackle this problem. According to the invention, the ramp geometry is arranged so that undercarriage wheels on the aircraft centre line follow a different launch path profile from those away from the centre line. Since the wheels on and off the centre line will be at different longitudinal positions on the aircraft, a pitching moment is thus applied to correct the aircraft pitch rate at launch.

The invention may be carried into practice in numerous ways, as for example:

(a) An auxiliary wedge-shaped ramp or ramps, attached to the surface of the main ramp, to be traversed either only by centre line wheels or only by off-centre line wheels.

(b) Modification of the cross-section of the main ramp by stepping or cambering to give different longitudinal section profiles at different regions across the ramp.

(c) A part of parts of the main ramp surface can be hinged or otherwise made variable in geometry.

The invention may be more clearly understood with reference to one arrangement in accordance therewith shown, by way of example, in the accompanying drawing, in which an aircraft 1 is depicted travelling along a substantially horizontal deck 2 before climbing a ramp 3 being a continuation of the main deck 1 or rigidly secured upon it.

A pair of auxiliary ramps 4 are located at the exit end of the ramp 3 either forming an integral part of the ramp structure or comprising separate demountable units. These ramps are, for example, of a thickness increasing linearly with length and are symmetrically disposed about the longitudinal centre line of the ramp 3 so that they adequately align with outrigger wheel assemblies 5 provided at each wing tip of the aircraft 1. The aircraft accelerates up the ramp 3 and just prior to exit the outrigger wheels 5 traverse the auxiliary ramps 4. Since the auxiliary ramps 4 are higher than the basic profile 6 of the main ramp traversed by the nose wheel assembly 7, with the nose wheel clear of the ramp the engagement of the outrigger wheels with the auxiliary ramps can impart any desired nose-down pitch change.

What we claim is:

1. An aircraft take-off runway for an aircraft having first and second sets of undercarriage wheels the second set being spaced both laterally and longitudinally of the aircraft from the first set, said runway having a terminal ramp that curves upward toward its end to launch the aircraft in a semi-ballistic trajectory, and further comprising at least one auxiliary ramp section upon the end portion of the main ramp and forming part of the runway surface which auxiliary ramp section has in the longitudinal direction of the ramp a different slope from the main ramp with the difference in the spacing between the surface of the auxillary ramp and the main ramp increasing as the end of the main ramp is approached; said auxiliary ramp section occupying only a part of the width of the main ramp at a position where only one of said first and second sets of undercarriage wheels traverses said auxiliary ramp section during aircraft take-off while the other set remains contiguous with the main ramp, said auxillary ramp providing a predetermined pitching moment to the aircraft at the instant of launch from the runway.

2. A runway according to claim 1 wherein said auxiliary ramp section is wedge-shaped and is disposed centrally on the main ramp, to be traversed only by the first set of wheels which are substantially on the aircraft centre line.

3. A runway according to claim 1, wherein a part of the main ramp surface is hinged to form said auxiliary ramp section.

4. A runway according to claim 1 wherein two auxiliary wedgeshaped ramp sections are disposed symmetrically about the longitudinal centre line of the main ramp to align with aircraft outrigger wheel assemblies.

5. A runway according to claim 4, wherein each auxiliary ramp section has a thickness increasing linearly with length up to the end of the main ramp.

* * * * *